United States Patent
B N et al.

(10) Patent No.: US 12,199,871 B2
(45) Date of Patent: Jan. 14, 2025

(54) CLIENT SIDE BACKOFF FILTER FOR RATE LIMITING

(71) Applicant: Intuit Inc., Mountain View, CA (US)

(72) Inventors: Nandan B N, Shivamogga (IN); A. Sushanth Kamath, Bangalore (IN); Dhivya Arumugam, Karnataka (IN); Venkata Krishna Murthy Vadrevu, Bangalore (IN); Rajendra Jayendra Gosavi, Navi Mumbai (IN); Anil Kumar Attuluri, San Diego, CA (US); Sagar Shukla, Bagalore (IN); Jason Michael Webb, Valley Center, CA (US); Akash Jain, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/525,686

(22) Filed: Nov. 30, 2023

(65) Prior Publication Data
US 2024/0314075 A1    Sep. 19, 2024

Related U.S. Application Data

(63) Continuation of application No. 18/183,020, filed on Mar. 13, 2023, now Pat. No. 11,876,713.

(51) Int. Cl.
*H04L 67/56* (2022.01)
*H04L 47/11* (2022.01)

(52) U.S. Cl.
CPC ............ *H04L 47/115* (2013.01); *H04L 67/56* (2022.05)

(58) Field of Classification Search
CPC ....... H04L 47/115; H04L 67/56; H04L 67/568
See application file for complete search history.

(56) References Cited

U.S. PATENT DOCUMENTS

| | | | |
|---|---|---|---|
| 10,033,587 B2 | 7/2018 | Tofighbakhsh et al. | |
| 10,368,255 B2* | 7/2019 | Gunasekara | H04W 48/18 |
| 2004/0179499 A1* | 9/2004 | Sindhushayana | H04L 1/0025 370/335 |
| 2006/0200496 A1 | 9/2006 | Okman et al. | |
| 2006/0235991 A1* | 10/2006 | Brown | H04L 67/59 709/233 |

(Continued)

OTHER PUBLICATIONS

"Rate-Limiting Strategies and Techniques", https://cloud.google.com/architecture/rate-limiting-strategies-techniques, Feb. 8, 2023, 9 pages.

*Primary Examiner* — Atique Ahmed
(74) *Attorney, Agent, or Firm* — Lathrop GPM LLP

(57) ABSTRACT

A method in a client backoff filter. The method includes receiving, from a server, a backoff data packet having backoff metadata. The method also includes saving the backoff metadata in a cache local to the client backoff filter. The method also includes receiving a subsequent request for service. The method also includes checking whether an attribute of the subsequent request for service matches the backoff metadata in the cache. The method also includes performing, responsive to checking, an action including at least one of the group including: blocking, responsive to the attribute matching the backoff metadata in the cache, transmission of the subsequent request for service to a server, and transmitting, responsive to the attribute failing to match the backoff metadata in the cache, the subsequent request for service to the server.

17 Claims, 7 Drawing Sheets

(56) References Cited

U.S. PATENT DOCUMENTS

| | | | |
|---|---|---|---|
| 2007/0250212 A1* | 10/2007 | Halloran | A47L 9/009 |
| | | | 901/1 |
| 2011/0093557 A1 | 4/2011 | Riocreux et al. | |
| 2012/0117621 A1 | 5/2012 | Kondamuru et al. | |
| 2012/0257571 A1 | 10/2012 | Liao | |
| 2014/0241333 A1* | 8/2014 | Kim | H04W 48/16 |
| | | | 370/338 |
| 2015/0023162 A1 | 1/2015 | Alisawi et al. | |
| 2015/0358662 A1* | 12/2015 | Drouin | H04N 21/2225 |
| | | | 725/97 |
| 2016/0291595 A1* | 10/2016 | Halloran | G05D 1/0242 |
| 2019/0149573 A1 | 5/2019 | Park et al. | |
| 2020/0045117 A1 | 2/2020 | Ross et al. | |
| 2020/0389487 A1* | 12/2020 | Zhauniarovich | H04L 63/1491 |
| 2021/0288735 A1 | 9/2021 | Yamagishi | |
| 2022/0247686 A1* | 8/2022 | Rajagopalan | H04L 63/20 |

* cited by examiner

CLIENT SIDE BACKOFF FILTER FOR RATE LIMITING

RELATED APPLICATIONS

This application is a continuation application of U.S. application Ser. No. 18/183,020, filed Mar. 13, 2023, the entirety of which is hereby incorporated by reference in its entirety.

BACKGROUND

A service hosted on a server may, when network processing, receive an abundance of requests for the service.

SUMMARY

One or more embodiments provide for a method in a client backoff filter. The method includes receiving, from a server, a backoff data packet having backoff metadata. The method also includes saving the backoff metadata in a cache local to the client backoff filter. The method also includes receiving a subsequent request for service. The method also includes checking whether an attribute of the subsequent request for service matches the backoff metadata in the cache. The method also includes performing, responsive to checking, an action including one of: blocking, responsive to the attribute matching the backoff metadata in the cache, transmission of the subsequent request for service to a server, or transmitting, responsive to the attribute failing to match the backoff metadata in the cache, the subsequent request for service to the server.

One or more embodiments also provide for a system. The system includes a server having a processor and a cache. The system also includes a data repository in communication with the server and storing a backoff data packet including backoff metadata. The data repository also stores a subsequent request for service and an attribute of the subsequent request for service. The system also includes a client filter which, when executed by the processor receives the backoff data packet. The client filter, when executed by the processor, also saves the backoff metadata in the cache. The client filter, when executed by the processor, also receives the subsequent request for service. The client filter, when executed by the processor, also checks whether the attribute of the subsequent request for service matches the backoff metadata in the cache. The client filter, when executed by the processor, also performs, responsive to checking, an action including one of: blocking, responsive to the attribute matching the backoff metadata in the cache, transmission of the subsequent request for service to a server, or transmitting, responsive to the attribute failing to match the backoff metadata in the cache, the subsequent request for service to the server.

One or more embodiments also provide for a method performed at a throttle filter hosted on a server. The method includes receiving, a request for service from a client. The method also includes generating, responsive to the server determining that the server is too busy to process the service request, a backoff data packet. The method also includes generating a modified backoff data packet by adding, to a header of the backoff data packet, metadata describing attributes which a client backoff filter may use to impose a limit on transmission of subsequent requests for service. The method also includes transmitting, to the client backoff filter, the modified backoff data packet.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1:
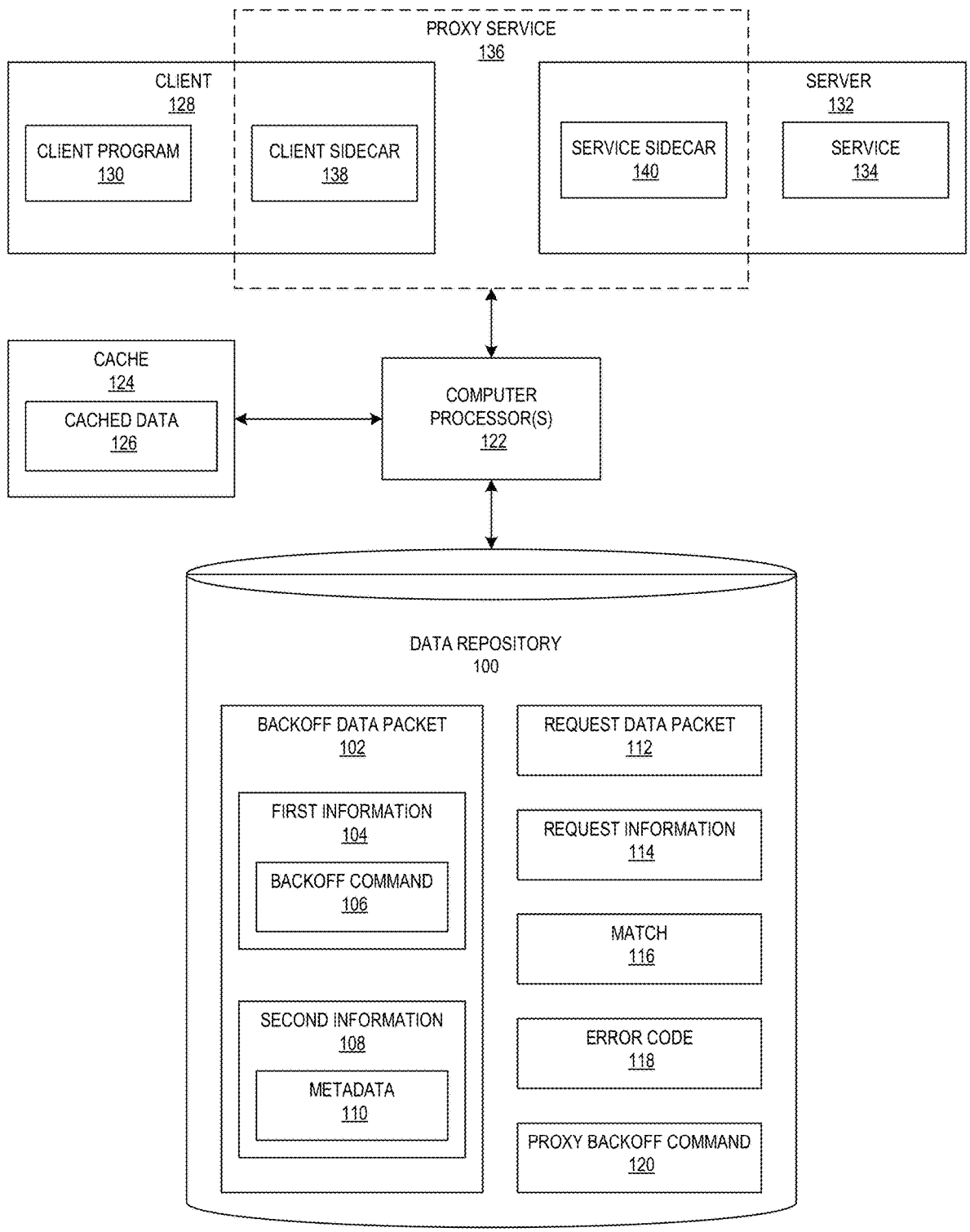
FIG. 1 shows a computing system of a client-side backoff filter for rate limiting, in accordance with one or more embodiments.

In general, embodiments are directed to controlling network traffic in a network. The network includes a client, that executes a client application that requests a service, and a server, which hosts and executes the service. The client and the server are one or more computers and/or executing software applications (e.g., the client application and the service). The client and the server communicate via a network. The data packets, exchanged by the client and the server over the network, constitute the network traffic. The network traffic also may be known as network communications.

A technical problem can arise during the network communications between the client and the server. Specifically, the service or the server may become overwhelmed by too many requests, whether from one client or from many clients. The term "too many" in this context means that the server cannot process all pending requests within a predetermined time threshold (e.g., 100 milliseconds). Those requests in excess of the processing speed of the service or server may be referred—to as excess requests. Excess requests may be timed out, meaning that the client or the service reports an error that the excess requests cannot be processed in time.

It may be possible for the client to generate another request for the service. However, if the service or server remain overwhelmed by excess requests, then the subsequent request also may timeout. Thus, accessing the service may become difficult.

One approach for dealing with the above technical problem is for the server or service to return a data packet to the client that indicates that the server or service is too busy to respond to new service requests from the client. The data packet contains an automated request to the client to stop sending requests for service to the service or server. Such a data packet may be referred to as a "backoff" data packet, and the request is a "backoff request." The backoff data packet may be known, in some cases, as a "429 error," as in some network systems the code "429" is an error code that indicates that the server or service is busy and that the client should cease sending requests for the service.

The backoff data packet may include a backoff time. The backoff time indicates the amount of time that the client is requested to allow to pass before the client sends another request for the service.

When the client, or clients, comply with the backoff request and wait the requested backoff time before sending a new service request, the service or server has time to process currently pending requests. Thus, the service or server is not overwhelmed by a barrage of new service requests. Thereafter, the service may continue to provide the requested service to the client or to other clients.

However, an additional technical problem can arise when this network traffic throttling scheme is employed. In particular, when the service or server returns a 429 error (i.e., the backoff data packet), the service or server use a quantifiable amount of computing resources (time, bandwidth, processor cycles, etc.). Generating the backoff data packets therefore may reduce the computing resources available to process the large number of service requests. The term "large number" is determined relative to the available computing resources of the service or server.

Furthermore, if the client cannot comply or refuses to comply with the backoff request, then the number of service requests is not reduced. As a result, the problem of the service or server becoming overwhelmed is exacerbated, not reduced. In particular, the server or service is generating the backoff data packets in addition to attempting to process an excess of service requests.

One or more embodiments address the above-identified technical problem by transferring the burden of generation of at least some of the backoff data packets to a proxy service. After the service or server issues the first backoff request, the proxy service dynamically generates backoff notices on a possibly client—by client bases. In this manner, the computing resources of the service or server may concentrate on processing the requests for service.

More particularly, the proxy service of one or more embodiments may determine when to limit calls to a service executing on a server. When a service is overwhelmed with requests, the service transmits a backoff data packet to the proxy. The backoff data packet includes a command to limit further requests to the service, as well as metadata (e.g. a timestamp) describing the event. The backoff data packet is added to a cache. When a new service request is sent by a client, the proxy intercepts the new service request. The new service request is compared against the information in the cache. If a match is found, then the proxy service transmits blocks transmission of the new service request to the service, and may also transmit an error code to the client.

In this manner, the service will not be overwhelmed by new service calls. One or more embodiments have the additional technical advantage of providing a selective backoff mechanism which can be configured based on changing network conditions.

Attention is now turned the figures. FIG. 1 shows a computing system of a client-side backoff filter for rate limiting, in accordance with one or more embodiments. The system shown in FIG. 1 may be implemented, at least in part, using the computing system and network environment described with respect to FIG. 5A and FIG. 5B.

The system shown in FIG. 1 includes a data repository (100). The data repository (100) may be a type of storage unit and/or device (e.g., a file system, database, data structure, or any other storage mechanism) for storing data. The data repository (100) may include multiple different, potentially heterogeneous, storage units and/or devices.

One or more embodiments describe various data packets. Generally, a data packet is a computer network packet of data that may be transmitted over a network, possibly in the form of multiple sub-packets of data. The types of data packets described herein contain specific types of data and have specific functions in the methods described with respect to FIG. 2 and FIG. 3.

The data repository (100) may store a backoff data packet (102). The backoff data packet (102) is a data packet used at least to communicate a backoff request to a client computing system or a client application. The backoff data packet (102) includes a header. A header is a portion of a data packet that stores information used by routers and other computing systems during the transmission of the backoff data packet (102) over a network.

The backoff data packet (102) also includes first information (104). The first information (104) is computer-readable data relating to a backoff command issued by a server or a server proxy. Thus, the first information (104) includes at least a backoff command (106). The backoff command (106) is computer instructions which are programmed to request that another computing system cease transmitting at least some service requests to a service executing on a server.

The backoff data packet (102) also includes second information (108). The second information (108) includes computer-readable data that describes information relating to the first information (104). Thus, the second information (108) at least includes metadata (110). The term "metadata" means "data that describes some other data." The metadata (110) may include, but is not limited to, a time stamp of when the server issued backoff request; a backoff time interval during which service request should not be provided, identities of rules that a client or the proxy of one or more embodiments should apply when submitting additional service requests or processing new service requests; a universal resource indicator (URI) or a path or method to which a backoff throttle should be applied; a quota of service requests allocated to the client, backoff attributes to be included in a cache (described below), etc.

The data repository (100) also includes a request data packet (112). The request data packet (112) is a data packet generated by a client or a client application and transmitted over a network to a service or a server hosting the service. The request data packet (112) contains computer readable commands which request the service to perform a function. The service or server will then return the output of the function via one or more output data packets that are transmitted back to the client or client application for additional processing.

The data repository (100) also stores request information (114). The request information (114) is data associated with the request data packet (112). The term "associated with" means that the request information (114) is contained in the request data packet (112), or is additional data that is referenced to the request data packet (112) or otherwise relevant to a later determination of whether the request data packet should be blocked or transmitted to the service or server. Examples of additional data included in the request information (114) may be the identity of the service or server, the identity of the client application or client, the backoff time interval, a quota, a rule, a uniform resource link, etc.

The request information (114) may be distinguished from the metadata (110) in one or two aspects. First, the request information (114) is formatted for comparison to the cached data. Second, optionally, the request information (114) may include information in addition to the metadata (110) provided in the backoff data packet (102). Such additional information may be supplied by other, prior transmissions from the service or server, may be supplied by the programming of the proxy, may be taken from the request data packet (112), or may be derived from other sources.

In use, the request information (114) is compared to cached data (described below) in order to determine whether the proxy service (described below) will take an action when the proxy service receives the request data packet (112). The process of comparing the request information (114) to the cached data is described with respect to FIG. 2.

The data repository (100) also may store a match (116). The match (116) is an output of an algorithm that compares the request information (114) to cached data (described below). Specifically, the match (116) indicates that the match (116) and the cached data are within a predetermined tolerance of each other. An exact match means that the request information (114) exactly matches the cached data. An approximate match means that the request information (114) is within a predetermined range of values of the cached data. For the purposes of the one or more embodiments, the match (116) may be programmed to be an exact match, and approximate match, or a combination of exact matches and approximate matches, possibly depending on the identities of the client and the service.

The data repository (100) also stores an error code (118). The error code (118) is a sequence of characters which represents a type of error that is generated by the server or by the proxy. For example, the error code (118) may be a "429 error code." A 429 error code, in this example, is an error code that indicates that the server or the service is too busy to process a received service request. Note, however, that the same type of busy status of the server may be communicated using different codes than that provided by the example.

The error code (118) may contain additional information. For example, in one embodiment, the error code (118) may be the backoff data packet (102). However, in another embodiment, the error code (118) may be separate from the backoff data packet (102). For example, the error code (118) may include only the type of error thrown by the service, server, or proxy. In this case, the error code (118) may be included in the backoff data packet (102).

The data repository (100) also includes a proxy backoff command (120). The proxy backoff command (120) is a backoff command transmitted by some part of the proxy service, rather than by the service or the server. Thus, for example, the proxy backoff command (120) may be the backoff data packet (102), but is specifically transmitted by the proxy service rather than by the service or the server.

The system shown in FIG. 1 may include other components. For example, the system shown in FIG. 1 may include a computer processor (122). The computer processor (122) is one or more computer hardware or virtual processors, possibly operating in a distributed computing environment. An example of the computer processor (122) is shown in FIG. 5A. The computer processor (122) may execute the method of FIG. 2 or the method of FIG. 3, and also may execute the steps described with respect to the example of FIG. 4A through FIG. 4C.

The system shown in FIG. 1 also may include a cache (124). The cache (124) is a hardware or virtual data storage, in the form of either a non-transitory computer readable storage medium or transitory storage. The cache (124) is, specifically, a type of data storage which the computer processor (122) may access more quickly than the data repository (100). The cache (124) is in electronic communication with the computer processor (122).

For example, the cache (124) may be random access memory (RAM) in one example. In another example, the cache (124) is a data structure, such as a table or a relational database, stored in a non-transitory computer readable storage medium.

The cache (124) stores cached data (126). The cached data (126) is data which the proxy service (described below) uses to determine whether the request data packet (112) from a client should be passed onto the service or the server. Specifically, the computer processor (122) compares the cached data (126) to the request information (114) in order to determine whether the match (116) exists, as described further with respect to FIG. 2.

The cached data (126) includes at least the metadata (110). In addition, the cached data (126) may also include rules and other information taken from sources external to the request data packet (112). For example, the cached data (126) may be information taken from the backoff data packet (102), information in addition to the metadata (110) that is taken from the request data packet (112), the backoff command (106), and combinations thereof. A specific example of the cached data (126) is shown in FIG. 4C.

The system shown in FIG. 1 optionally may include a client (128). The client (128) is one or more computing systems that are physically or logically distinct from other computers in the system shown in FIG. 1. However, the client (128) could be executed by the computer processor (122), or by a processor responsible for executing functions of the server in some examples.

The client (128) need not be part of the system shown in FIG. 1. For example, in an embodiment, the client (128) may be operated by a remote user. For example, the client (128) may be a personal computer which, while executing a client program, attempts to access a service or the server.

The client (128) includes a client program (130). The client program (130) is an application expressed as software or application specific hardware. The client program (130) may be, for example, a web browser or some other program installed on the client (128). In a specific example, the client program (130) may be a web browser or user interface associated with a financial management application that constitutes a service executing on the server.

The client program (130) generates the request data packet (112), described above, as part of execution of the client program (130). The request data packet (112), for example, may request data from the server or the output of execution of a service executing on the server.

The system shown in FIG. 1 also includes a server (132). The server (132) is one or more computing systems, possibly operating in a distributed computing environment. The server (132) may include one or more separate processors, or may be executed using the computer processor (122) described above.

The server (132) hosts a service (134). The service (134) is one or more applications expressed as software or application specific hardware. The service (134) may be, for example, a database which, when queried by the request data packet (112) from the client program (130), returns the desired data to the client program (130). The service (134) may be an application which, when executed in response to the request data packet (112), returns an output to the client program (130). In a specific example, the service (134) may be a financial management application.

The system shown in FIG. 1 also includes a proxy service (136). The proxy service (136) is an application expressed as software or application specific hardware in communication with the computer processor (122). The proxy service (136) is programmed to execute the methods described with respect to FIG. 2 or FIG. 3. In a specific example, the proxy service (136) may operate as described with respect to FIG. 4A through FIG. 4C.

The proxy service (136), as shown in FIG. 1, includes two applications, a client sidecar (138) and a service sidecar (140). A "sidecar" is a stand-alone application that is configured to operate in conjunction with a second, distinct application. In the example of FIG. 1, the client sidecar (138) is configured to operate in conjunction with the service sidecar (140), but the client sidecar (138) and the service sidecar (140) are distinct applications. In the example of FIG. 1, the client sidecar (138) is executed by a processor of the client (128), and the service sidecar (140) is executed by a processor of the server (132). However, the proxy service (136) could be executed by a distinct processor that executes both sidecars. The functions of the client sidecar (138) and the service sidecar (140) are described with respect to FIG. 2, and exemplified in FIG. 4B.

The client sidecar (138) controls transmission of the request data packet (112). In particular, the client sidecar (138) may receive the backoff data packet (102), add information to the cached data (126), receive the request data packet (112), compare the request information (114) to the cached data (126) to determine the match (116), and possibly block or allow transmission of the request data packet (112) to the server. The client sidecar (138) also may be configured to transmit the error code (118) to the client (128) or to the client program (130), responsive to a determination that the request data packet (112) should be blocked.

In this manner, the client sidecar (138) takes on the burden of transmitting the error code (118) or the proxy backoff command (120) to every new request to the client program (130) that does not comply with the backoff command (106) of the server (132) or the service (134). Accordingly, the computing resources of the server (132) are preserved. Hence, one or more embodiments may be characterized as a client-side backoff filter for rate limiting, even though the service sidecar (140) of the proxy service (136) may execute as a server-side application or as a separate proxy server in some embodiments.

The service sidecar (140) controls transmission of the backoff data packet (102) to the client (128). In particular, the service sidecar (140) may generate the backoff data packet (102) and include the backoff command (106) and the metadata (110) in the backoff data packet (102).

The proxy service (136) shown in FIG. 1 is shown in dotted lines, as the proxy service (136) need not exist as a distinct logical entity. The proxy service (136) may be the combination of the functions performed by the client sidecar (138) and the service sidecar (140), as described with respect to FIG. 2. In this case, messages are transmitted back and forth between the client sidecar (138) executing on the client (128) and the service sidecar (140) executing on the server (132).

However, in another embodiment, the proxy service (136) may be executed by a separate proxy server. In this case, the client (128) communicates with the proxy service (136) and the server (132) communicates with the proxy service (136), but the client (128) and the server (132) do not necessarily directly interact with each other. In this arrangement, a processor of the proxy service (136) executes the client sidecar (138) and the service sidecar (140). If the proxy service (136) is expressed as one or more proxy servers, then the client sidecar (138) and the service sidecar (140) may be part of a single software program, rather than executing as different logical applications.

Whatever the arrangement of the proxy service (136), the client sidecar (138) may be characterized as a client-side application disposed in a communication path between the client (128) and the server (132). The term "client side" means that the client sidecar (138) is configured to control the transmission of the request data packet (112) to the server (132) in the communication path, as described above and further with respect to FIG. 2. The term "client side" in this context does not necessarily mean that the client sidecar (138) is executed by the client (128), as the client sidecar (138) may be executed by a distinct proxy server, as described above.

Similarly, the service sidecar (140) may be characterized as a server-side application disposed in the communication path between the client (128) and the server (132). The term "server side" means that the service sidecar (140) is configured to control the transmission of the backoff data packet (102) to the client (128) in the communication path, as described above and further with respect to FIG. 2. The term "server side" in this context does not necessarily mean that the service sidecar (140) is executed by the server (132), as the service sidecar (140) may be executed by a distinct proxy server, as described above.

While FIG. 1 shows a configuration of components, other configurations may be used without departing from the scope of the invention. For example, various components may be combined to create a single component. As another example, the functionality performed by a single component may be performed by two or more components.

Figure 2:
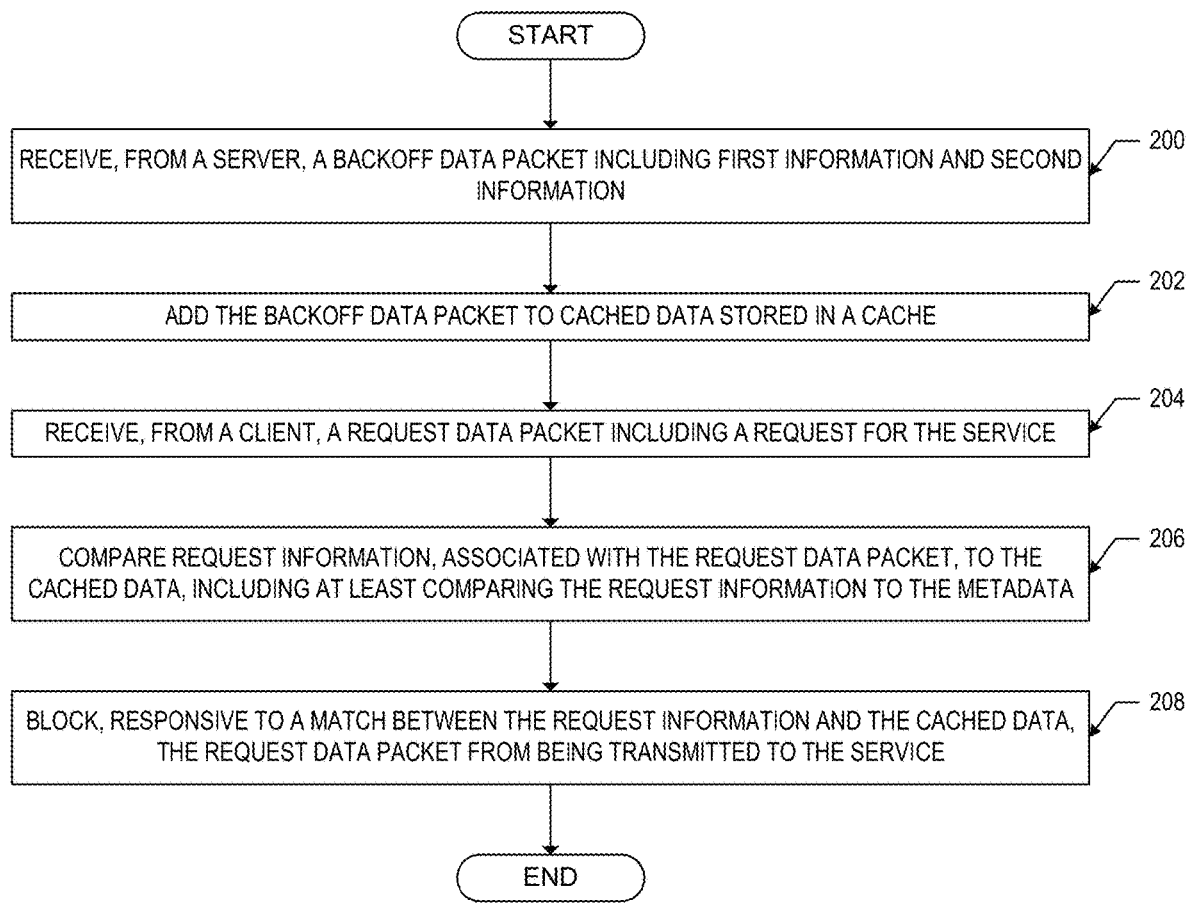
FIG. 2 and FIG. 3 show flowcharts of client-side backoff filtering for rate limiting, in accordance with one or more embodiments.
Figure 3:
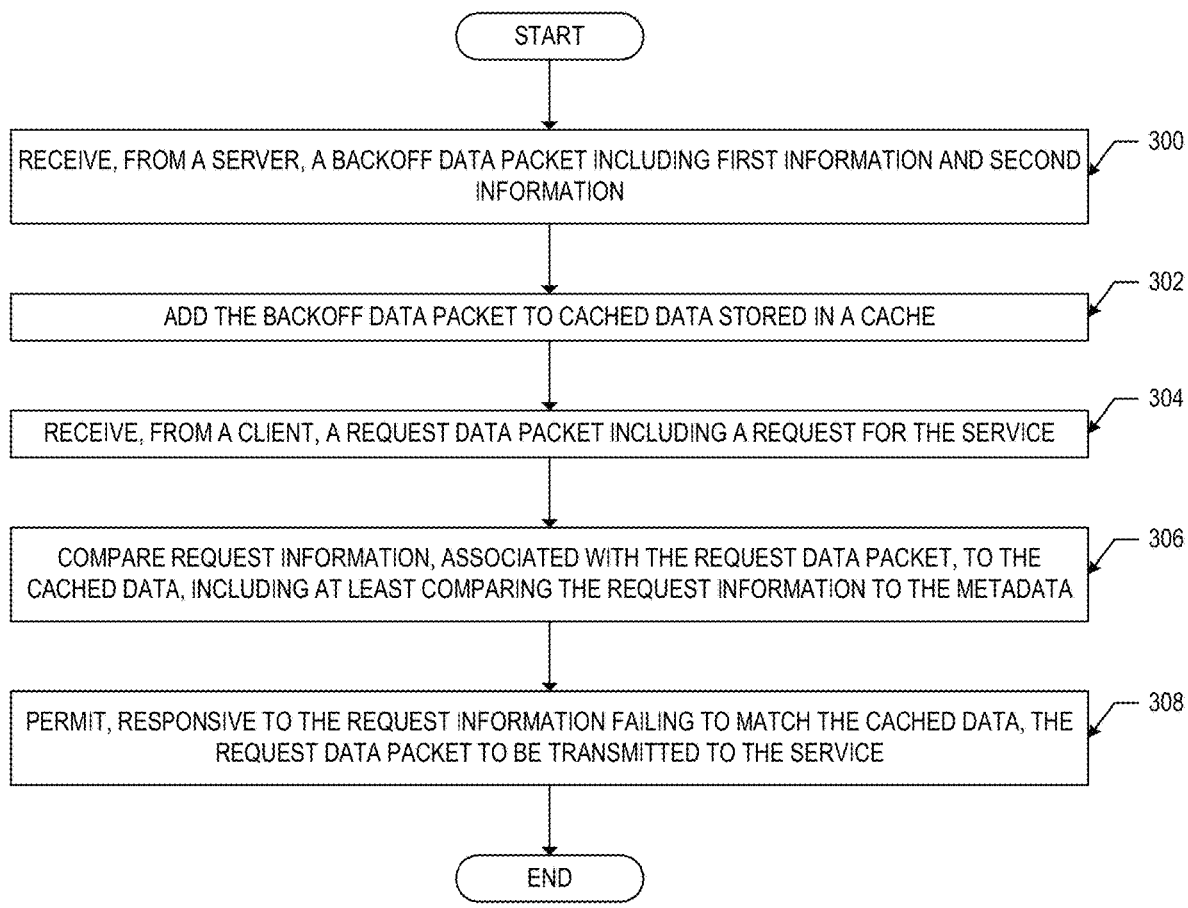

FIG. 2 and FIG. 3 show flowcharts of client-side backoff filtering for rate limiting, in accordance with one or more embodiments. The methods of FIG. 2 and FIG. 3 may be implemented using the system shown in FIG. 1, possibly in conjunction with the computing system and network environment shown in FIG. 5A and FIG. 5B.

Attention is first turned to FIG. 2. Step 200 includes receiving, from a server, a backoff data packet including first information and second information. The first information includes a backoff command to cease transmitting at least some requests to a service executing on the server. The second information includes metadata.

The backoff data packet may be transmitted by the server over a network and received at the proxy service. More specifically, the backoff data packet may be received at a client sidecar of the proxy service, as shown in FIG. 1 and exemplified by FIG. 4B.

The backoff data packet may be generated by the proxy service. More specifically, the backoff data packet may be generated by a service sidecar of the proxy service, as shown in FIG. 1 and exemplified by FIG. 4B. The backoff data packet includes at least a backoff command, which is generated by the service or the server when the service or the server become overwhelmed by request data packets.

The proxy service (e.g., the service sidecar) also may add additional information, such as metadata or other identifying information. For example, based on the identity of the client program, the service sidecar may add a rule or reference a rule or a link to a program that should be applied when the request information is compared to the cashed data at step 206, below.

Step 202 includes adding the backoff data packet to cached data stored in a cache. The phrase "adding the backoff data packet to the cached data" means that some or all of the information in the backoff data packet is added to the cached data. The backoff data packet need not be added in its entirety to the cache.

It is contemplated that only relevant information is taken from the backoff data packet and added to the cache. Relevant information is that information in the backoff data packet which includes an entry type for the cached data. For example, assume the cached data includes four data types: service identifiers, client identifiers, a backoff time interval, and a request data packet quota. In this case, the relevant data in the backoff data packet would be the service identifier, client identifier, backoff time interval and request packet quote contained in the back off data packet. The relevant information is stored in the cache.

The relevant information could include other information, such as rules or references to rules, timestamps, or other types of information. Thus, the example provided above does not necessarily limit the one or more embodiments.

Step 204 includes receiving, from a client, a request data packet including a request for the service. The request data packet is generated by a client application executing on the client. The request data packet is generated according to the programming of the client application to request that a service hosted on a server execute a function, and then return an output of the function to the client application.

More specifically, the request data packet is received at the proxy service. For example, the request data packet may be received at the client sidecar or at a separate proxy service.

Step 206 includes comparing request information, associated with the request data packet, to the cached data, including at least comparing the request information to the metadata from the service or the server. As described above with respect to FIG. 1, the request information includes at least information from the request data packet. However, also as described above with respect to FIG. 1, the request information may include information taken from sources other than the request data packet.

Thus, step 206 may include a sub-step of combining information in the request data packet with information taken from other sources in order to form the request information. For example, information may be retrieved or received from the service, from the server, from the client application, from the client, from additional data sources available to the proxy service, or other sources of information. The additional information may include the identity of the service or server, the identity of the client application or client, the backoff time interval, a quota, a rule, a uniform resource link.

Comparing the request information to the cached data may include searching the cached data for information that matches the request information. If a match is found, then a match is returned. Otherwise, an indication that no match is found is returned.

Step 208 includes blocking, responsive to a match between the request information and the cached data, the request data packet from being transmitted to the service. Blocking may be performed by failing to transmit the request data packet to the service or server, as in an embodiment the communication path between the client and the server requires passing through the intervening proxy service. Thus, by failing to transmit the request data packet through the proxy service the request data service is effectively blocked. Blocking also may be performed by intercepting the request data packet and preventing the request data packet from being transmitted to the service or server.

Generally, the steps of FIG. 2 (receiving the backoff data packet, adding the backoff data packet to cached data, receiving the request data packet, comparing the request information to the cached data, and blocking the request data packet) may be performed by a proxy service disposed in a communication path between the client and the server. However, the proxy service may be implemented as a client sidecar and a service sidecar, as shown in FIG. 1 and further exemplified in FIG. 4B. Thus, while the client processor and the server processor may separately execute the client sidecar and the service sidecar, the steps of FIG. 2 are still considered to have been performed by one proxy service.

In this case, the proxy service is the combination of the client sidecar and the service sidecar. Accordingly, the client sidecar may be considered a client-side application disposed in the communication path between the client and the service sidecar. Thus, receiving the backoff data packet, adding, receiving the request data packet, comparing, and blocking are performed by the client sidecar.

Similarly, the service sidecar is a server-side application disposed in the communication path between the service and the client sidecar. Receiving the backoff command, generating the backoff data packet, or transmitting the backoff data packet to the client sidecar may be performed by the service sidecar.

In an alternative embodiment, as mentioned with respect to FIG. 1, the proxy service is a separate application executed by an independent processor. In this case, the method of FIG. 2 is executed by the separate application.

The method of FIG. 2 may be varied, including more, fewer, or modified steps. For example, generating the backoff data packet may further include generating, by the service sidecar, the metadata. Generating the backoff data packet also includes adding, by the service sidecar, the backoff command and the metadata to the backoff data packet.

In another embodiment, the method of FIG. 2 also may include transmitting an error code to the client. Transmitting the error code to the client may also include transmitting the error code to the client application. The error code indicates to the client that the service received too many requests.

The method of FIG. 2 also may include transmitting a proxy backoff command to the client to cease transmitting additional request data packets. Transmitting the backoff command to the client also may include transmitting the backoff command to the client application.

In another variation, the metadata may include a backoff time header of the backoff data packet. The backoff time header indicates a time period during which further request data packets will be blocked. Thus, the method may include blocking future request data packets until the time period has expired.

In still another variation, the metadata may include an authority header of the backoff data packet. The authority header indicates an identity of the service. Thus, the method may include blocking future request data packets to that service, among possibly many services executing on the server. Other request data packets to the other services may continue to be transmitted.

In yet another variation, the metadata may further include an identity of a rule or a path. The rule indicates only a subset of additional request data packets to be blocked. In this case, the method also includes blocking only the subset of additional request data packets.

Alternatively, the path may indicate a communication path, among multiple communication paths, from which the additional request data packets are to be blocked. In this case, the method also may include blocking only those further request data packets transmitted over the specified communication path.

In another embodiment, the metadata may specific a quota of additional request data packets that will be accepted within a specified time period. In this case, the method may further include blocking those additional request data packets that exceed the quota.

Attention is now turned to FIG. 3. FIG. 3 shows a variation of the method of FIG. 2 in which the proxy permits the request data packet is to be transmitted to the service.

The first four steps of FIG. 3 are the same as the first four steps of FIG. 2. Thus, Step 300 corresponds to Step 200, Step 302 corresponds to step 202, Step 304 corresponds to step 204, and step 306 corresponds to Step 206. The method of FIG. 3 also may be varied, in a manner similar to that described for FIG. 2.

However, rather than blocking the request data packet, Step 308 of FIG. 3 includes permitting, responsive to the request information failing to match the cached data, the request data packet to be transmitted to the service. In other words, when a match does not occur, the proxy service may transmit, or permit transmission of, the request data packet to the service or the server.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

Figure 4A:
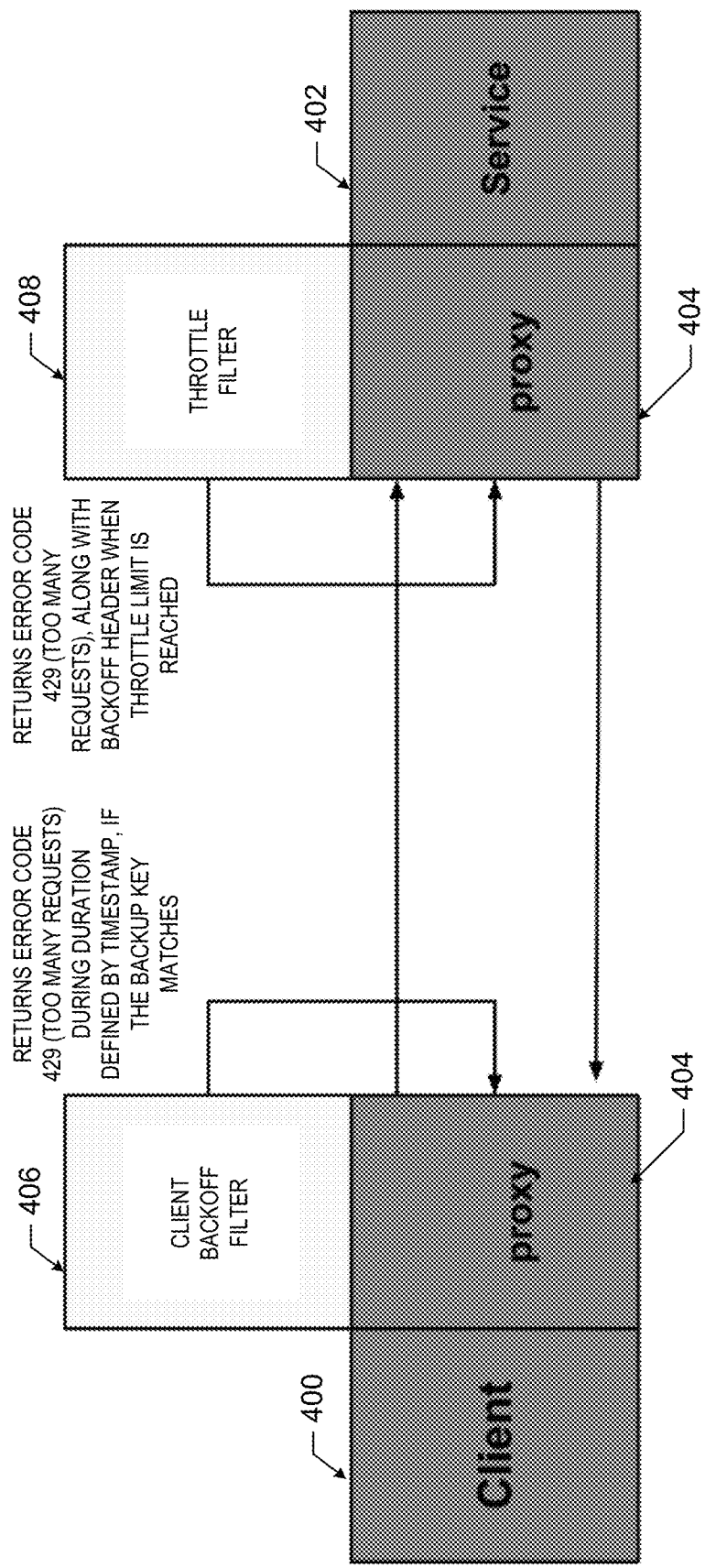
FIG. 4A, FIG. 4B, and FIG. 4C show an example of a client-side backoff filter for rate limiting, in accordance with one or more embodiments.
Figure 4B:
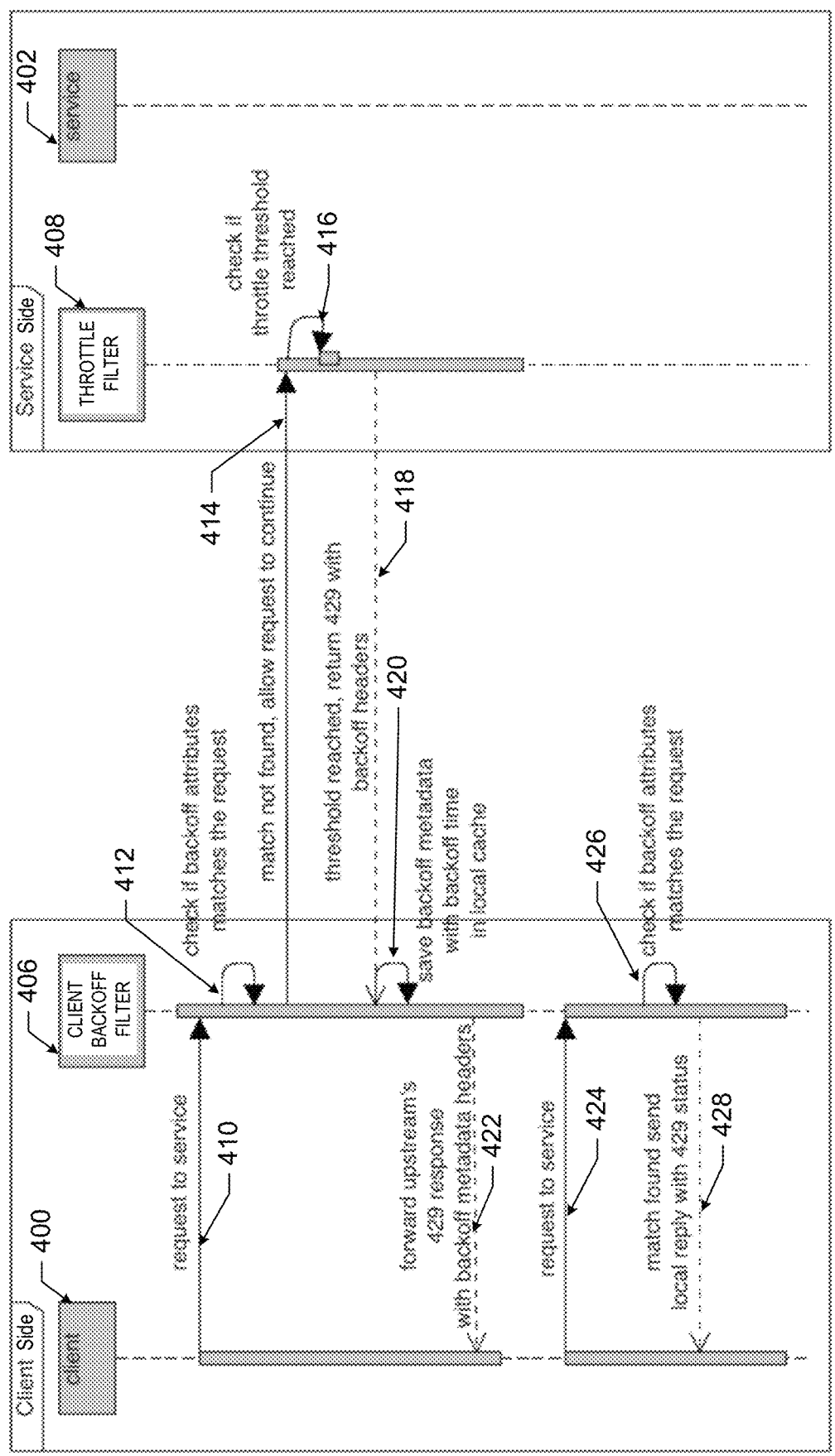
Figure 4C:
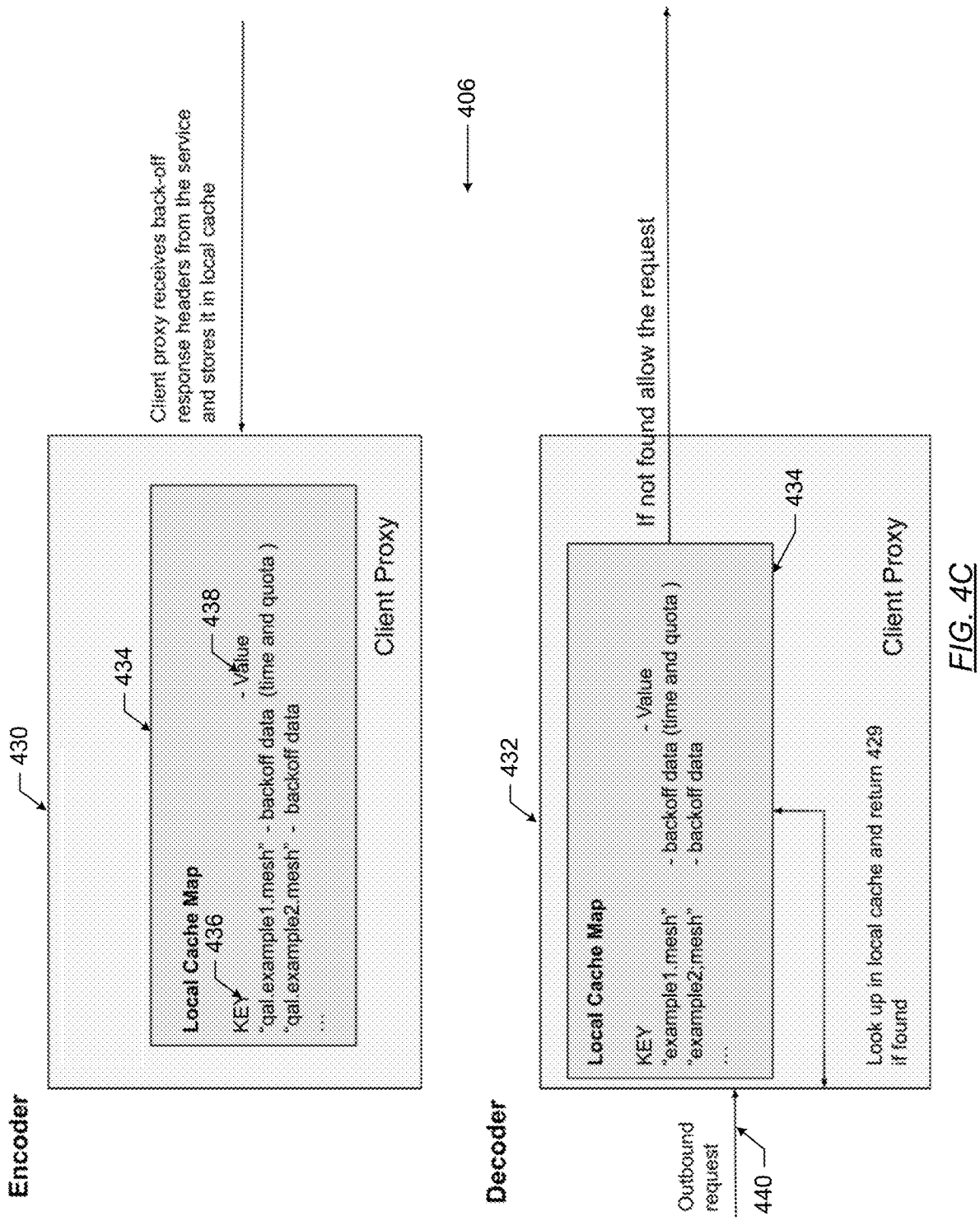
Figure 5A:
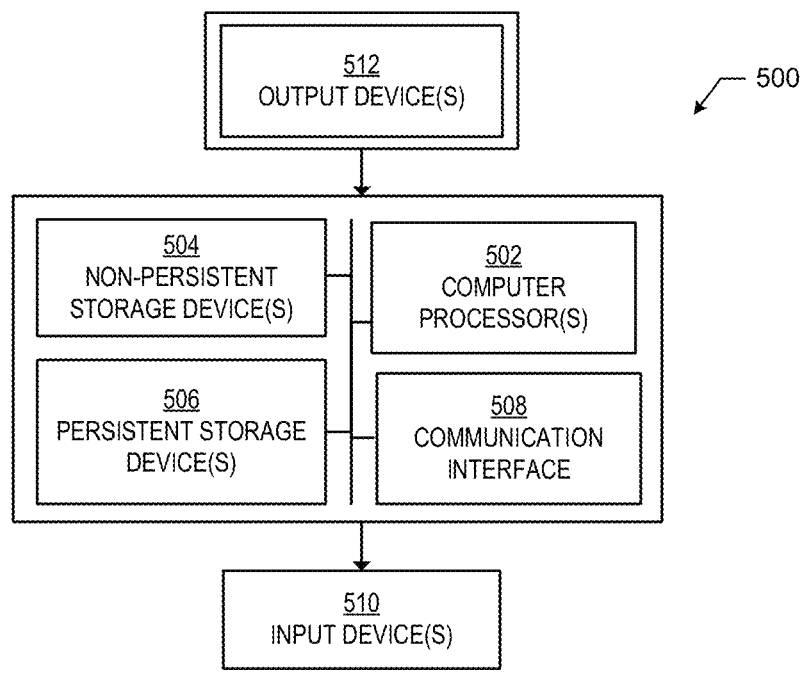
FIG. 5A and FIG. 5B show a computing system and network environment, in accordance with one or more embodiments.

FIG. 4A, FIG. 4B, and FIG. 4C show an example of a client-side backoff filter for rate limiting, in accordance with one or more embodiments. The following example is for explanatory purposes only and not intended to limit the scope of the invention. The example shown in FIG. 4A through FIG. 4C may be implemented using the system shown in FIG. 1, possibly in conjunction with the computing system and network environment shown in FIG. 5A and FIG. 5B. The example shown in FIG. 4A through FIG. 4C may be a variation of the methods described with respect to FIG. 2 and FIG. 3.

FIG. 4A shows a client (400) which requests services from a service (402). The client (400) communicates with the service (402) via a proxy (404). The proxy (404) includes a client backoff filter (406) and a throttle filter (408). The backoff filter (406) may be the client sidecar (138) of FIG. 1, which operates as described with respect to FIG. 1 through FIG. 3. Likewise, the throttle filter (408) may be the service sidecar (140) of FIG. 1, which operates as described with respect to FIG. 1 through FIG. 3. As FIG. 4A through FIG. 4C represent one example, reference numerals common to FIG. 4A through FIG. 4C refer to similar components having similar functions.

Whenever the service (402) rejects a request due to rate limiting, response headers with metadata and a specified backoff interval are sent back to the client (400). The client backoff filter (406) of the proxy (404) honors the backoff headers and reject requests to the service. The client backoff filter (406) retursn a 429 error code (too many requests) from the client backoff filter (406) for the duration specified by the throttle filter (408) or for a predetermined time.

When the service (402) is using a throttle algorithm and the throttle counter value hits the threshold configured, the throttle filter (408) returns the back-off header with a timestamp and an optional metadata header. The client backoff filter (406) will look for this specific back-off header and return a 429 error code from the client-side proxy itself. As a result, the load on the service (402) is reduced.

FIG. 4B shows the data flow between the client (400) and the service (402). Initially, at arrow (410), the client (400) sends a request data packet to the service (402). The client backoff filter (406) intercepts the request data packet. The client backoff filter (406) checks whether the backoff attributes already established for the service (402) match the service request, as shown at arrow (412).

If a match is not found, as shown by arrow (414), then the service request is permitted to be transmitted to the throttle filter (408). As shown at arrow (416), the throttle filter (408) may check to see whether a throttle threshold is reached. A throttle threshold is a service side threshold that indicates whether a new limit on the number of request data packets should be applied at the client backoff filter (406).

If the throttle threshold is not reached, then the service (402) may process the request data packet normally. The returned output is then sent back to the client (400), possibly through the throttle filter (408) and the client backoff filter (406), but possibly sent bypassing the proxy service. The returned output is not shown in FIG. 4B.

However, if the throttle threshold is reached at arrow (416), then the throttle filter (408) returns an error code 429 (too many service requests), as shown by arrow (418). In addition, the throttle filter (408) also transmits backoff headers, such as backoff metadata that may modify how the new backoff limits should be applied by the client backoff filter (406).

Thus, as shown by arrow (420), the client backoff filter (406) saves the backoff metadata with a backoff time interval in a local cache. The metadata is as described with respect to FIG. 1.

The client backoff filter (406) then forwards the 429 error code (too many requests) with any relevant backoff metadata headers to the client (400), as shown by arrow (422). In an embodiment, the client (400) reacts by refraining from addressing further requests data packets to the service (402).

However, in another embodiment, the client (400) transmits a new request for service, as shown by arrows (424). The client backoff filter (406) intercepts the new request for service. As shown by arrow (426), the client backoff filter (406) checks whether backoff attributes saved in the cache matches information contained in the request data packet.

If the match is not found (e.g., the new request data packet fails to satisfy some rule established by the backoff metadata at arrow (420), then the request data packet is passed to the throttle filter (408) and the service (402), as described with respect to arrow (414) and arrow (416). However, if the match is found, then as shown by arrow (428), the client backoff filter (406) transmits a local reply with the 429 error code (service too busy) back to the client (400).

In this manner, the computing resource burden of transmitting error codes that the server is too busy is removed from the service (402) and instead is transferred to the proxy (404), and in particular to the client backoff filter (406). As a result, one or more embodiments provide for a client-side backoff filter for data packet transmission rate limiting.

FIG. 4C shows additional details of the operation of the client backoff filter (406). The client backoff filter (406) may be characterized as an encoder (430) and a decoder (432). The encoder takes the backoff request and metadata sent by the service (402) and encodes that information into a local cache (434). Note that, for convenient reference, FIG. 4C shows the cache (434) with respect to both the encoder (430) and the decoder (432). However, the encoder (430) and the decoder (432) may reference a single cache (i.e., the cache (434)).

The cache (434) includes one or more keys (436) and one or more values (438) for the keys (436). Each key represents an identity of a service. Each value represents the backoff conditions currently imposed for the corresponding service (e.g., the time the limits are applied, quotas on how many new requests may be sent, other rules, communication paths, etc.).

When a client sends an output request (i.e. a new request data packet), as shown by arrow (440) the decoder (432) decodes relevant information in the request data packet. Relevant information means that the decoder (432) finds information in the request data packet that may be compared to the information stored in the cache (434). Thus, having the decoded information, the client proxy is able to compare the decoded information from the new request data packet and determine if there is a match with the values in the cache (434).

If a match exists, then the client proxy returns an error code 429 (service too busy) back to the client. Otherwise, if a match is not found, the request data packet is sent to the service for further processing, as described with respect to FIG. 4B above.

Additional details regarding the operation of the encoder (430) are now presented. The encoder (430) looks for rate limit backoff headers from a response data package sent from the service. There may be three headers that are returned whenever the throttle limit is reached.

One of the headers may be a backoff time header. The backoff time header may be returned with the time measured in Unix epoch milliseconds, rather than returning the interval in milliseconds to backoff. Unix epoch milliseconds may be preferred because calculating the backoff time at client side based on milliseconds might include the network lag and other computation time before reaching the client backoff filter. An example backoff time header may be as follows: "x-intuit-ratelimit-backoff-time: 1670473694".

A second of the headers may be a backoff authority header. A backoff authority header may be received as part of the outbound encoder filter chain. Thus, there may be limited access to authority, method, or request metadata in such response headers. In this case, it is possible to forward the backoff authority from the service throttle filter. An example backoff authority header may be as follows: "x-intuit-ratelimit-backoff-authority: example.mesh".

A third of the headers may be a backoff metadata header. As one or more embodiments may support multiple rules for a single service or other asset, the backoff metadata header may help to identify exactly the rule or specific uniform resource indicator (URI) path or method to be used when the throttle limit is reached. Thus, the backoff metadata header may be applied only to certain request data packets, and not others, as established by the rule or URI path or method.

For example, whenever the throttle limit is reached for a specific quota rule, the quota's metadata may be marshaled into a JSON string and encoded into base64. Then, the metadata may be sent as part of the backoff metadata header. An example backoff metadata header may be as follows: "Example header: x-intuit-ratelimit-backoff-metadata: 'base64 encoded metadata'".

If any of the above three headers are found, the encoder (430) may store the respective backoff attributes in the local cache map. The authority of the service in question may be used as a key in the local cache map. The list of backoff attributes as may be used as the corresponding value in the local cache map.

Attention is now turned to additional details regarding the decoder (432). Whenever an outbound request (i.e., the request data packet) is received, the decoder (432) of the client sidecar may look into the local cache map for the incoming authority. If the key is found in the cache, then the decoder will check if the incoming request matches against a rule in the cache, and validate if the current time is less than the backoff time. If yes, then the client sidecar will send a local reply with a 429 status code, else the client sidecar will allow the request to continue to the server sidecar, service, or server.

If the request data packet does match with "/*" rule, the client sidecar will check if there are any quotas matching the current request data packet, and validate if the current time is less than the backoff time. If yes, then the client sidecar sends a local reply with a 429 status code back to the client application. Otherwise, the client sidecar allows the request data packet to continue to the service sidecar, the service, or the server.

If the matching backoff quota is found, but the current time is not less than the backoff time, then the backoff quota attributes may be removed from the local cache. Thus, the cache may be maintained and updated over time.

One or more embodiments may also be applied in other contexts. For example, one or more embodiments may be used in an authentication context. In this case, the proxy service acts to authorize or de-authorize users or systems based on rules or changing conditions at the service or server. The server sidecar provides an authorization to the client sidecar, and the client sidecar blocks new requests for the service that are not authorized. Other variations are also possible.

Because the cache is updated over time based on input from the server sidecar (which in turn is generated based on changing conditions at the service or server), the data packet filtering operation of the client sidecar is dynamic. For example, as conditions change, different backoff rules may be applied, backoff times may be modified, and other filtering conditions set for whatever prevailing conditions exist at any given time. Thus, one or more embodiments no only relieve a computational burden from the service or server, but one or more embodiments also improve the responsiveness of the network as network conditions change.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
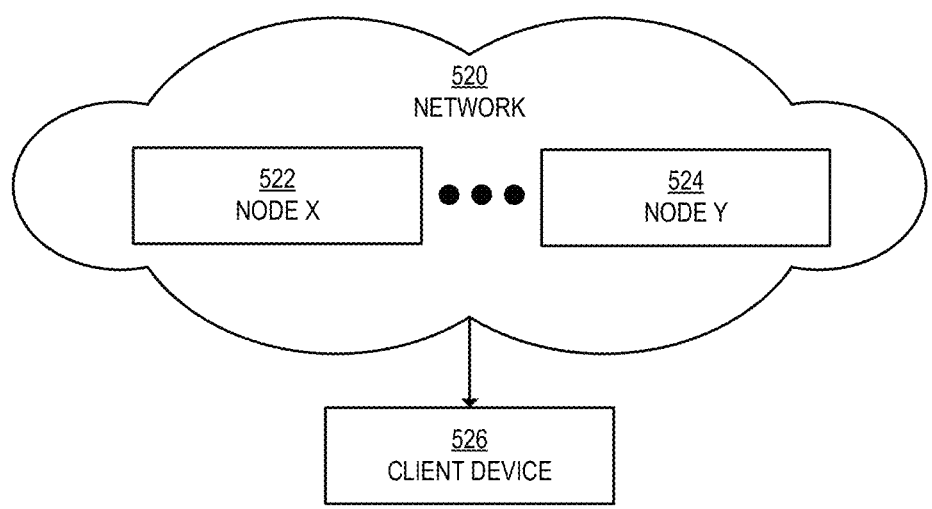

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method in a client backoff filter, the method comprising:
   receiving, from a server, a backoff data packet comprising backoff metadata;
   saving the backoff metadata in a cache local to the client backoff filter;
   receiving a subsequent request for service;
   checking whether an attribute of the subsequent request for service matches the backoff metadata in the cache;
   performing, responsive to checking, an action comprising at least one from a group consisting of:
   blocking, responsive to the attribute matching the backoff metadata in the cache, transmission of the subsequent request for service to the server, and
   transmitting, responsive to the attribute failing to match the backoff metadata in the cache, the subsequent request for service to the server, wherein the client backoff filter is part of a client proxy by which a client that generates the subsequent request for service communicates with a server proxy for a server.

2. The method of claim 1, further comprising:
receiving, before receiving the backoff data packet, a first request for service;
checking, responsive to receiving the first request for service, whether one or more backoff attributes matches the first request for service; and
transmitting, responsive to no match being found, the first request for service to a throttle filter of a server.

3. The method of claim 2, wherein the backoff data packet is received responsive to transmitting the first request for service.

4. The method of claim 1, further comprising:
receiving, before receiving the backoff data packet, a first request for service;
checking, responsive to receiving the first request for service, whether one or more backoff attributes matches the first request for service; and
blocking, responsive to a match existing between the one or more backoff attributes and the first request for service, transmission of the first request for service to a throttle filter of a server.

5. The method of claim 1, further comprising:
forwarding the backoff data packet to a client that requested the subsequent request for service, wherein the backoff data packet commands the client to cease transmitting future requests for service.

6. The method of claim 1, wherein the client backoff filter and the cache are programmed as an encoder, and wherein saving the backoff metadata in the cache further comprises:
saving, by the encoder, the backoff metadata as a key and a plurality of values for the key.

7. The method of claim 6, wherein each of the plurality of values represents a corresponding backoff condition currently imposed on a service identified by the key.

8. The method of claim 7, wherein the corresponding backoff condition comprises at least one from the group consisting of a time the corresponding backoff condition is applied, a quota on how many new service requests may be sent, and a communication path by which a new request for service may be sent.

9. The method of claim 1, wherein the client backoff filter and the cache are programmed as a decoder, and wherein checking whether the attribute of the subsequent request for service matches the backoff metadata further comprises:
identifying a key in the cache, wherein the key corresponds to a service corresponding to the subsequent request for service;
comparing the attribute of the subsequent request for service to a value in the cache that corresponds to the key; and
determining that the attribute matches the attribute in the backoff metadata when the attribute matches the value.

10. A system comprising:
a server comprising a processor and a cache;
a data repository in communication with the server and storing:
a backoff data packet comprising backoff metadata,
a subsequent request for service, and
an attribute of the subsequent request for service; and
a client filter which, when executed by the processor:
receives the backoff data packet,
saves the backoff metadata in the cache,
receives the subsequent request for service,
checks whether the attribute of the subsequent request for service matches the backoff metadata in the cache, and
performs, responsive to checking, an action comprising at least one from the group consisting of:
blocking, responsive to the attribute matching the backoff metadata in the cache, transmission of the subsequent request for service to the server, and
transmitting, responsive to the attribute failing to match the backoff metadata in the cache, the subsequent request for service to the server,
wherein the client filter is part of a client proxy by which a client that generates the subsequent request for service communicates with a server proxy for a server.

11. The system of claim 10, wherein the client filter, when executed by the processor, further:
receives, before receiving the backoff data packet, a first request for service,
checks, responsive to receiving the first request for service, whether one or more backoff attributes matches the first request for service, and
transmits, responsive to no match being found, the first request for service to a throttle filter of a server.

12. The system of claim 10, wherein the client filter, when executed by the processor, further:
receives, before receiving the backoff data packet, a first request for service,
checks, responsive to receiving the first request for service, whether one or more backoff attributes matches the first request for service, and
blocks, responsive to a match existing between the one or more backoff attributes and the first request for service, transmission of the first request for service to a throttle filter of a server.

13. The system of claim 10, wherein the client filter, when executed by the processor, further:
forwards the backoff data packet to a client that requested the subsequent request for service, wherein the backoff data packet commands the client to cease transmitting future requests for service.

14. The system of claim 10, wherein the client filter and the cache are programmed as an encoder, and wherein saving the backoff metadata in the cache further comprises:
saving, by the encoder, the backoff metadata as a key and a plurality of values for the key.

15. The system of claim 14, wherein each of the plurality of values represents a corresponding backoff condition currently imposed on a service identified by the key.

16. The system of claim 15, wherein the corresponding backoff condition comprises at least one from the group consisting of a time the corresponding backoff condition is applied, a quota on how many new service requests may be sent, and a communication path by which a new request for service may be sent.

17. The system of claim 10, wherein the client filter and the cache are programmed as a decoder, and wherein the client filter checking whether the attribute of the subsequent request for service matches the backoff metadata further comprises:
identifying a key in the cache, wherein the key corresponds to a service corresponding to the subsequent request for service;
comparing the attribute of the subsequent request for service to a value in the cache that corresponds to the key; and determining that the attribute matches the attribute in the backoff metadata when the attribute matches the value.

\* \* \* \* \*